(12) United States Patent
Yoon et al.

(10) Patent No.: US 12,346,548 B2
(45) Date of Patent: Jul. 1, 2025

(54) METHOD FOR DISPLAYING CONTENT, METHOD FOR ANALYZING CONTENT, AND DEVICE FOR IMPLEMENTING THE SAME METHOD

(71) Applicant: SAMSUNG SDS CO., LTD., Seoul (KR)

(72) Inventors: Seung Hyun Yoon, Seoul (KR); Ji Hyun Hwang, Seoul (KR); Mi Suk Park, Seoul (KR); Ye Ji Kim, Seoul (KR); Hui Yeon Yang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 28 days.

(21) Appl. No.: 18/214,177

(22) Filed: Jun. 26, 2023

(65) Prior Publication Data

US 2024/0012556 A1    Jan. 11, 2024

(30) Foreign Application Priority Data

Jul. 7, 2022 (KR) ...................... 10-2022-00835592

(51) Int. Cl.
*G06F 3/0486*  (2013.01)
*G06F 3/04845* (2022.01)

(52) U.S. Cl.
CPC ........ *G06F 3/0486* (2013.01); *G06F 3/04845* (2013.01)

(58) Field of Classification Search
CPC ............... G06F 3/0486; G06F 3/04845; G06F 3/04847; G06F 3/0485; G06F 3/0488; G06F 2203/04806; G02B 27/646; G02B 2003/0093; G02B 13/0045; G02B 9/60
See application file for complete search history.

(56) References Cited

U.S. PATENT DOCUMENTS

| | | | | |
|---|---|---|---|---|
| 2011/0173564 | A1* | 7/2011 | Margarint | G06F 3/04855 715/800 |
| 2014/0101577 | A1* | 4/2014 | Kwak | G06F 3/1431 715/761 |
| 2015/0309701 | A1* | 10/2015 | Jätzold | G06F 16/2322 715/765 |

FOREIGN PATENT DOCUMENTS

| | | |
|---|---|---|
| KR | 10-2010-0085403 A | 7/2010 |
| KR | 10-1729981 B1 | 4/2017 |
| KR | 10-2018-0038434 A | 4/2018 |
| KR | 10-2018-0056273 A | 5/2018 |
| KR | 10-2020-0048786 A | 5/2020 |
| KR | 10-2021-0036224 A | 4/2021 |
| KR | 10-2372432 B1 | 3/2022 |

* cited by examiner

*Primary Examiner* — Cao H Nguyen
(74) *Attorney, Agent, or Firm* — Sughrue Mion, PLLC

(57) ABSTRACT

A method for displaying content performed by a computing device is provided. The method includes: displaying a detailed view indicator on an area of first content that is viewed in detail among a plurality of contents displayed on a screen, and displaying the first content in a detailed view mode in response to a user's drag input to the area of the first content.

18 Claims, 13 Drawing Sheets

METHOD FOR DISPLAYING CONTENT, METHOD FOR ANALYZING CONTENT, AND DEVICE FOR IMPLEMENTING THE SAME METHOD

CROSS-REFERENCE TO RELATED APPLICATION

This application claims priority from Korean Patent Application No. 10-2022-0083592 filed on Jul. 7, 2022 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a method for displaying content, a method for analyzing content, and a device for implementing the same method, and more particularly, to a method for displaying content, a method for analyzing content, and a device for implementing the same method for providing a detailed viewing function of content through user interaction using an interface.

2. Description of the Related Art

When searching for messages stored in a messenger, if there is a lot of data, it is common to display only a portion of the message by using functions such as folding/unfolding/thumbnail image.

In this case, a portion of the message is displayed by uniformly allocating a space regardless of the importance of the data. In order to check the details of a message, it is inconvenient for a user to click several messages at once.

The messenger includes a speech bubble form according to a timeline and a conversational form in which replies may be made to the speech bubble. In both forms, if one person writes a lot of data or replies increase, only summarized information is displayed in a folding manner. Therefore, in order to search for the summarized information, there is a problem in that unnecessary user interactions, such as continuously unfolding/viewing all, occur.

In addition, when the messenger shows the images in the form of thumbnail, it is difficult to check the entire image with only the thumbnail, and it is inconvenient to check by zooming in on the detailed screen after clicking the thumbnail.

In this way, when the user wants to check the details of the message or image on the messenger, the user has to click several times and get out of an existing search flow and move to a detailed screen. As a result, there is a problem that is difficult to search quickly.

Therefore, when searching for the message or image on the messenger or the like, a technology capable of checking the details with only a simple user interaction is required. In addition, a technology that may quickly search for important information through a convenient interface without passing through several steps is required.

SUMMARY

Aspects of the present disclosure provide a method for displaying content, a method for analyzing content, and a device for implementing the same method, which may check details of content through simple user interaction when searching for various types of content.

Aspects of the present disclosure also provide a method for displaying content, a method for analyzing content, and a device for implementing the same method, which may quickly search for important information without passing through several steps through a convenient interface when searching for various types of content.

Aspects of the present disclosure also provide a method for analyzing content, and a device for implementing the same method, which may preferentially expose an important area of content that a user wants to search for by analyzing behavioral information of multiple users for content.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a method for displaying content performed by a computing device. The method includes displaying a detailed view indicator on an area of first content that is viewed in detail among a plurality of contents displayed on a screen, and displaying the first content in a detailed view mode in response to a user's drag input to the area of the first content.

In some embodiments, the displaying of the first content in the detailed view mode may include displaying the first content in the detailed view mode in response to the drag input to the detailed view indicator.

In some embodiments, the displaying of the first content in the detailed view mode may include determining a degree of detail of the first content according to a length of the drag input.

In some embodiments, the first content may be magnifiable content, and in the detailed view mode, a degree to which the first content is magnified may be determined based on the length of the drag input.

In some embodiments, the method may further include releasing the detailed view mode in response to an end of the drag input.

In some embodiments, the method may further include maintaining the detailed view mode in response to an end of the drag input after a direction of the drag input is changed.

In some embodiments, the method may further include maintaining the degree of detail of the first content at a time point of change when a direction of the drag input is changed.

In some embodiments, the first content may be magnifiable content, and the displaying of the first content in the detailed view mode may include magnifying and displaying the first content centered on an important area.

In some embodiments, wherein the first content may be more viewable or magnifiable content, and the displaying of the first content in the detailed view mode may include preferentially exposing and displaying an important area of the first content.

In some embodiments, the drag input may be an input of dragging from right to left.

In some embodiments, a maximum distance to which the detailed view indicator is moved by the drag input may be determined by an attribute of the first content, and the attribute of the first content may include at least one of a type, a length, a size, or a screen display ratio of the first content.

In some embodiments, the displaying of the detailed view indicator on the area of the first content may include displaying the detailed view indicator in response to an analysis information on the first content being obtained.

According to an aspect of the present disclosure, there is provided a method for analyzing content performed by a server. The method includes collecting behavioral data of each of a plurality of users for content, determining an important area of the content based on an analysis result of the collected behavioral data, and providing information on the important area of the content.

In some embodiments, the collecting of the behavioral data of each of the plurality of users for the content may include receiving, from a plurality of user terminals, data of at least one of a number of clicks, a staying time, a number of inquiries, a number of replies, or a number of reactions.

In some embodiments, the collecting of the behavioral data of each of the plurality of users for the content may include collecting data of a center point and size of a zoom-in area and a staying time for an image of each of the plurality of users when a type of the content is the image.

In some embodiments, the determining of the important area of the content based on the analysis result of the collected behavioral data may include determining the important area of the content using data in which each value of the collected behavioral data is equal to or greater than a threshold value.

According to an aspect of the present disclosure, there is provided a content display device. The content display device includes a communication unit configured to communicate with an external device, a display unit configured to display information, and a control unit configured to control the display unit to display a detailed view indicator on an area of first content that is viewed in detail among a plurality of contents displayed on a screen, and display the first content in a detailed view mode in response to a user's drag input to the area of the first content.

In some embodiments, the control unit may be configured to obtain information on a central area of the first content and magnify and display the first content centered on an important area of the first content.

In some embodiments, when a type of the first content is an image, the important area of the first content may be determined as an area commonly magnified by a plurality of users for the image.

In some embodiments, when a type of the first content is a thumbnail view, the important area of the first content may be determined as an image having the number of inquires or a staying time equal to or greater than a reference value among images belonging to the thumbnail view.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
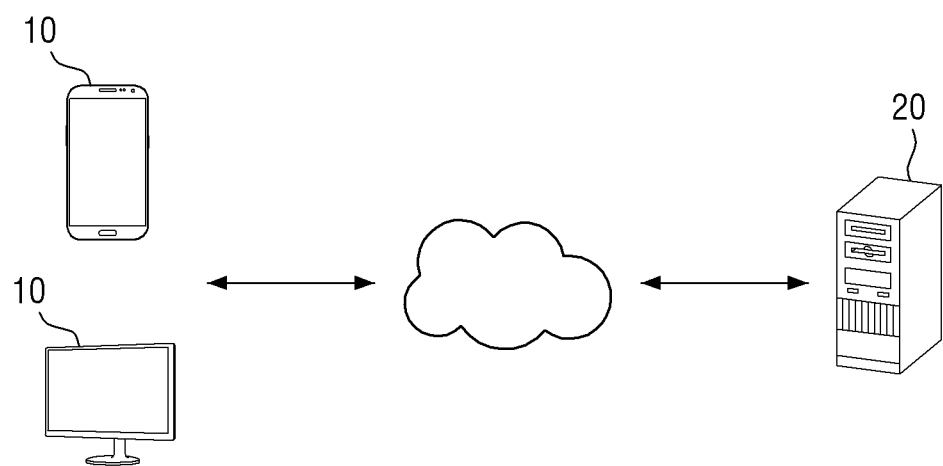
FIG. 1 illustrates a configuration of a content providing system according to an embodiment of the present disclosure.

Hereinafter, example embodiments of the present disclosure will be described with reference to the attached drawings. The advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, some embodiments of the present disclosure will be described in detail with reference to the accompanying drawings.

FIG. 1 illustrates a configuration of a content providing system according to an embodiment of the present disclosure. Referring to FIG. 1, a system according to an exemplary embodiment of the present disclosure includes a content display device 10 and a server 20, and the content display device 10 is connected to the server 20 through a network.

The content display device 10 may be implemented as a terminal that provides content in a detailed view mode using an analysis result of the content provided from the server 20. The content display device 10 may be, for example, any one of a mobile computing device such as a smart phone, a tablet personal computer (PC), a laptop PC, a personal digital assistant (PDA), and the like, and a fixed computing device such as a personal desktop PC.

The content display device 10 may include a communication unit (not illustrated) communicating with the server 20, a display unit (not illustrated) displaying information, and a control unit (not illustrated), and further include additional components.

The control unit of the content display device 10 controls the display unit to display a detailed view indicator in an area of first content that may be viewed in detail among a plurality of contents displayed on a screen.

Here, the first content may be a display of only a portion of an entire area of the content, such as, for example, messages, replies, images, diagrams, voting contents, etc. displayed on a messenger, replies displayed on a post, mails displayed on an email list, and individual images displayed on a thumbnail list. For example, when a length of a text is long, the first content may display only some text. In addition, when a size of the image is large, the first content may display a reduced image.

The first content may be displayed in a viewable more or unfoldable form, or may be displayed in a thumbnail image form. A detailed view indicator is displayed on an area of the screen on which the first content is displayed so that the first content may be unfold-viewed or magnified.

The control unit of the content display device 10 controls the display unit to display the first content in the detailed view mode in response to a user's drag input to an area of the first content. In this case, in the detailed view mode, the first content may be magnified and displayed or an important area of the first content may be displayed.

The server 20 is a device that collects and analyzes data to provide analysis information for a detailed view function of content, and may be provided as a stationary computing device such as a server or a PC, for example.

The server 20 provides to the content display device 10, analysis information for displaying the first content in the detailed view mode in the content display device 10.

The server 20 collects behavioral data for the first content of a user of the content display device 10 and a user of another terminal device. The behavioral data of the users may include, for example, the number of clicks, the staying time, the number of inquiries, the number of replies, the number of reactions, and the like on the first content. In addition, the first content is an image, the behavioral data of the users may include, for example, a center point of a zoomed-in area, a size of the zoomed-in area, and a staying time.

The server 20 may determine an important area of the first content by analyzing the behavioral data of the users for the first content collected as described above, and may provide information on the important area of the first content to the content display device 10.

Accordingly, the content display device 10 may obtain, from the server, the information on the important area of the first content as analysis information on the first content. The content display device 10 may magnify and display or preferentially expose and display the important area of the first content in the detailed view mode using the obtained information.

According to the configuration of the system of the present disclosure, details of the content may be quickly searched through simple user interaction. In addition, by analyzing the behavioral information of the users for the content, it is possible to preferentially provide the important area of the content when searching for the content.

Figure 2:
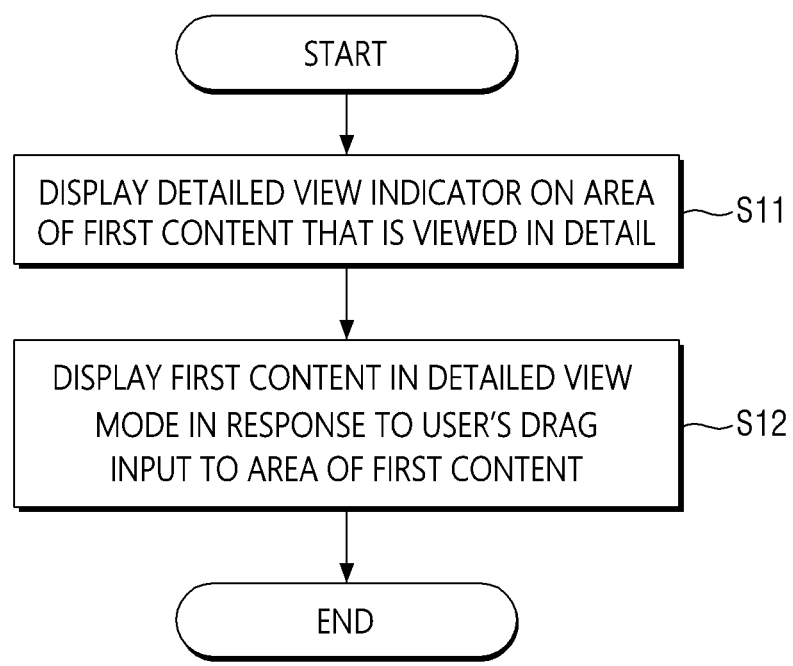
FIG. 2 is a flow chart for describing a method for displaying content according to an exemplary embodiment of the present disclosure.

FIG. 2 is a flow chart for describing a method for displaying content according to an exemplary embodiment of the present disclosure.

A method for displaying content according to an exemplary embodiment of the present disclosure may be executed by the content display device 10 illustrated in FIG. 1. The content display device 10 that executes the method according to the present exemplary embodiment may be a computing device 100 illustrated in FIG. 13. The content display device 10 may be, for example, a device capable of performing an arithmetic function, such as a smart phone, tablet, laptop computer, or PC.

It should be noted that description of a subject performing some operations included in the method according to an exemplary embodiment of the present disclosure may be omitted, and in such case, the subject is the content display device 10.

According to an exemplary embodiment of the present disclosure described below, content displayed in the form of some text or a reduced image on the screen may be displayed in the detailed view mode.

First, in operation S11, the content display device 10 displays a detailed view indicator on an area of first content that may be viewed in detail among a plurality of contents displayed on a screen.

The first content may be a display of only a portion of an entire area of the content, such as, for example, messages, replies, images, diagrams, voting contents, etc. displayed on a messenger, replies displayed on a post, mails displayed on an email list, and individual images displayed on a thumbnail list. The first content may be displayed in a viewable more or unfoldable form, or may be displayed in a thumbnail image form.

The detailed view indicator may be displayed as an image having a preset shape in an area in which the first content is displayed or around the area so that the area of the first content may be recognized. The detailed view indicator may be displayed in the form of arrows or brackets indicating directions in which a user input is possible, for example.

As an exemplary embodiment, in operation S11, the content display device 10 may display the detailed view indicator in response to the analysis information on the first content being obtained. As an example, the content display device 10 may display the detailed view indicator in the area of the first content at a time point when the information on the important area among entire hidden areas of the first content is received from the server 20, Here, the important area of the first content may be determined using a result of analyzing behavioral data of a plurality of users for the first content. As an example, an area in which each numerical value, such as the number of clicks, staying time, number of inquiries, number of replies, and number of reactions of the plurality of users for the first content, is equal to or greater than a predetermined reference value, may be determined as the important area.

As described above, the information on the important area of the first content may be implemented to be provided from the server 20. However, the present disclosure is not necessarily limited to the exemplary embodiment in which the information is provided from the server 20, the content display device 10 may also determine the important area of the first content by directly analyzing the behavioral data of the user collected by the corresponding device and behavioral data received from other user terminals.

Next, in operation S12, the content display device 10 displays the first content in the detailed view mode in response to a user's drag input to the area of the first content. Here, the first content may also be displayed in the detailed view mode in response to a drag input to the detailed view indicator displayed on the area of the first content, instead of the user's drag input to the area of the first content.

The drag input may be an input of dragging from right to left on the area of the first content or the detailed view indicator.

Figure 3:
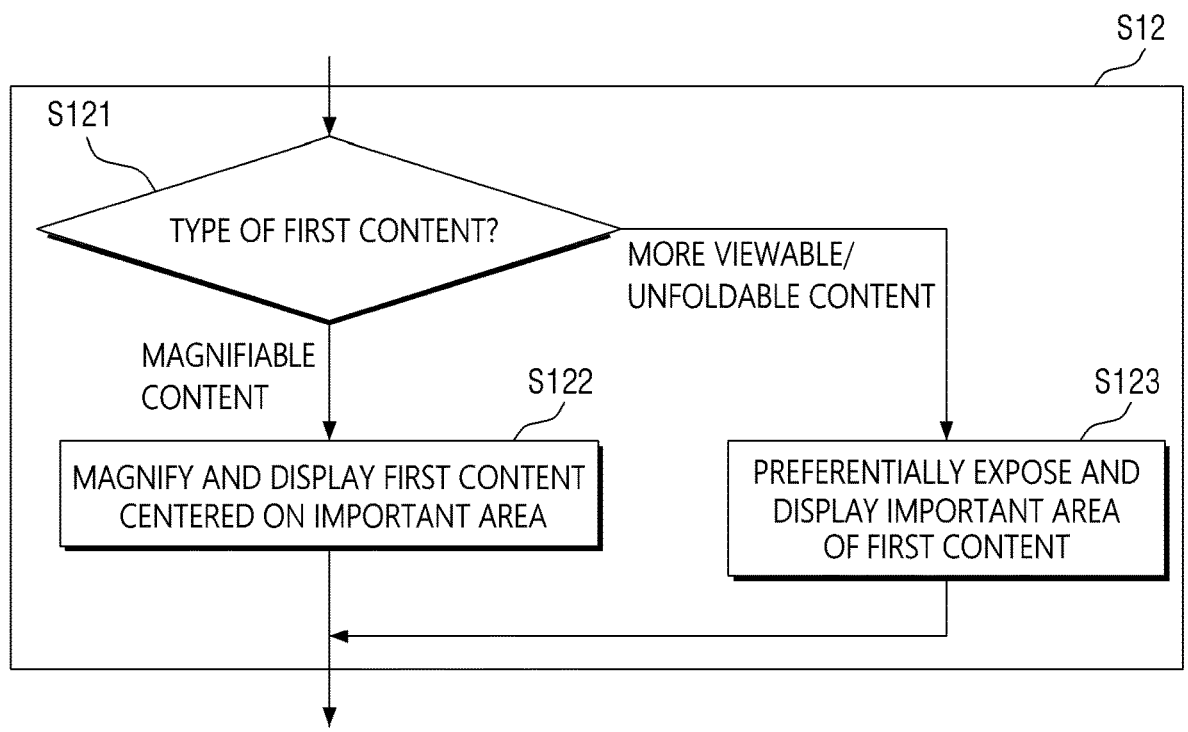
FIG. 3 is a flowchart for describing a detailed process of some steps illustrated in FIG. 2.

In an exemplary embodiment, referring to FIG. 3, operation S12 may include an operation S121 of determining what type of first content is, an operation S122 of magnifying and displaying the first content centered on the important area when the type of first content is magnifiable content, and an operation S123 of preferentially exposing and displaying the important area of the first content when the type of the first content is more viewable/unfoldable content.

Figure 5:
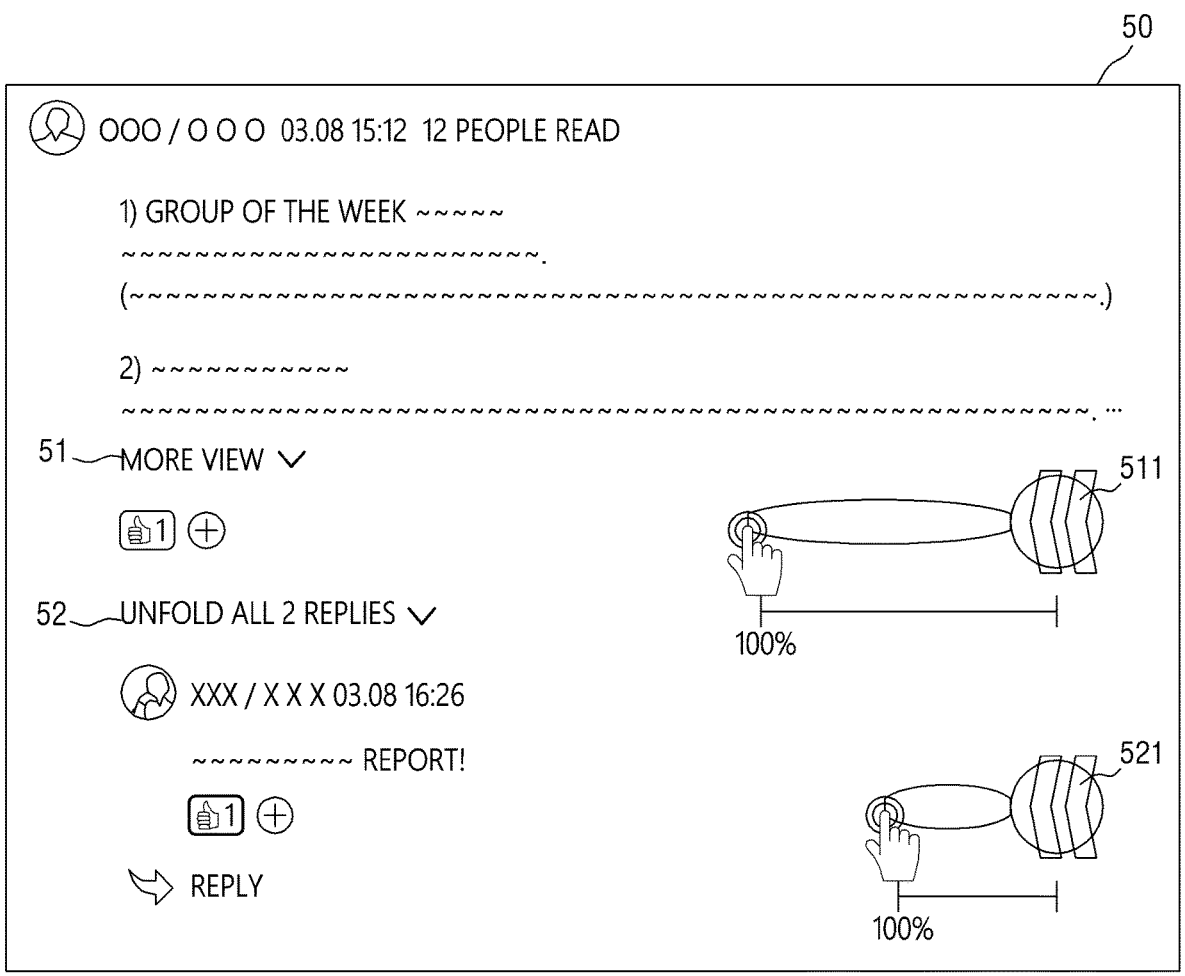
FIG. 5 is an example of displaying content in a detailed view mode using a detailed view indicator according to some exemplary embodiments of the present disclosure.

Referring to an example illustrated in FIG. 5, the content display device 10 may display a first detailed view indicator 511 in an area around a more viewable message 51 among messages displayed on a work collaboration board screen 50, and may display a second detailed view indicator 521 in an area around an unfoldable reply 52.

In this case, when the first detailed view indicator 511 is dragged from right to left, the entire hidden content of the more viewable message 51 may be displayed in an unfolded form. In addition, when the second detailed view indicator 521 is dragged from right to left, an entire hidden reply of the unfoldable reply 52 may be displayed in an unfolded form.

As an exemplary embodiment, in operation S12, when displaying the first content in the detailed view mode, the content display device 10 may determine the degree of detail of the first content according to a length of the drag input, and may display the first content according to the determined degree of detail. As an example, when the first content is magnifiable content such as a thumbnail image, the degree to which the first content is expanded in the detailed view mode may be determined in proportion to the length of the drag input.

As an exemplary embodiment, in operation S12, the content display device 10 may move the detailed view indicator displayed on the area of the first content according to the user's drag input. In this case, the drag input may be an input for moving the detailed view indicator in a left direction by pulling the detailed view indicator from right to left.

Figure 7:
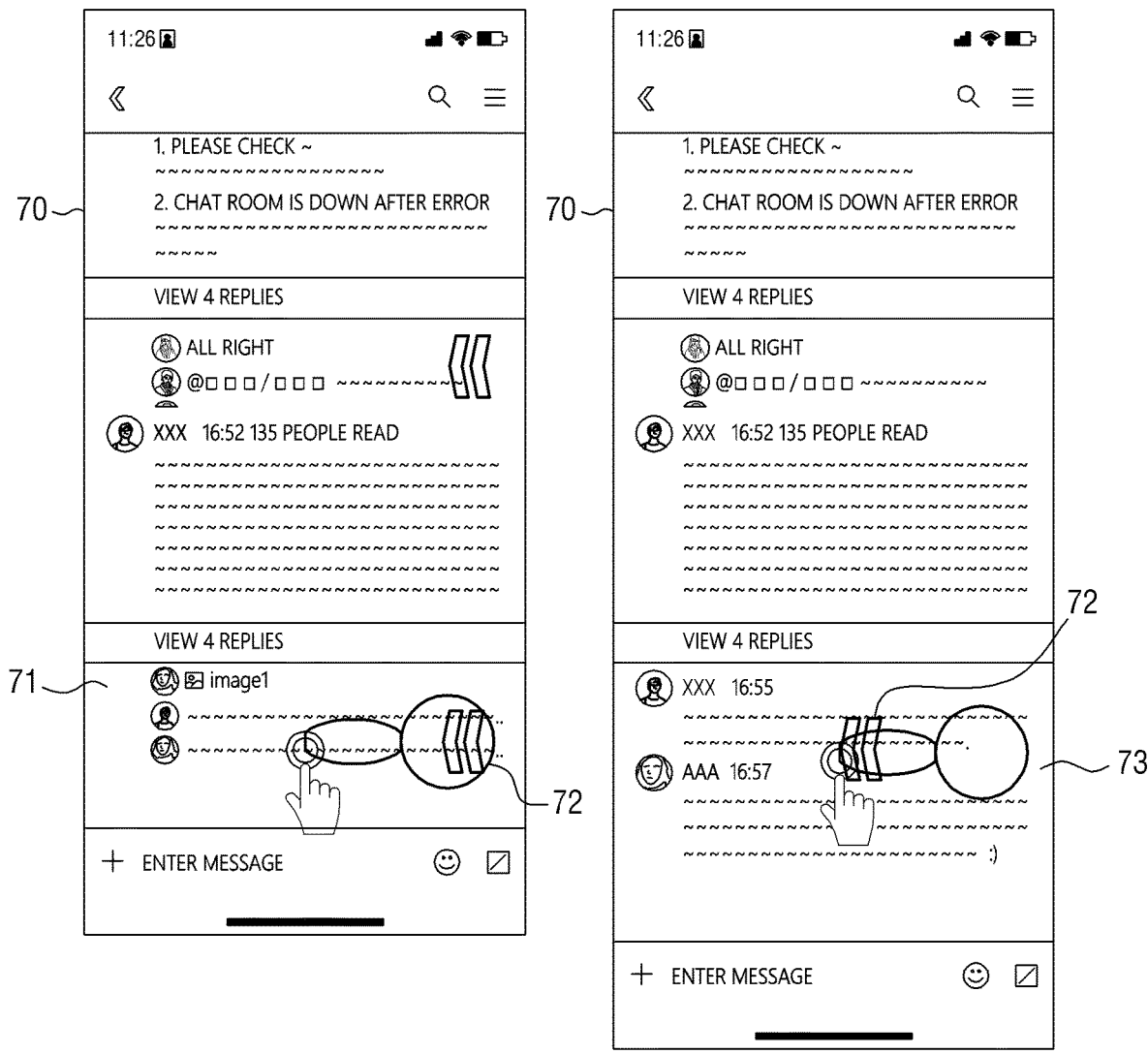
FIG. 7 is an example of preferentially exposing and displaying an important area of content in the detailed view mode according to some exemplary embodiments of the present disclosure.

As an example, as illustrated in FIG. 7, the content display device 10 may display a detailed view indicator 72 in an area around an unfoldable reply view 71 among messages displayed on a work collaboration board screen 70. In this case, the content display device 10 may preferentially display a reply analyzed as an important area 73 among replies hidden in the reply view 71 according to a drag input for moving the detailed view indicator 72 from right to left.

As an exemplary embodiment, a maximum distance at which the detailed view indicator is moved by the drag input may be determined by attributes of the first content. The attributes of the first content may include, for example, at least one of the type, length or size of content, and a screen display ratio.

As an example, as in the example illustrated in FIG. 5, a maximum distance at which the first detailed view indicator 511 may be moved to the left may be set to correspond to a length of the entire hidden content of the more viewable message 51. In addition, a maximum distance at which the second detailed view indicator 521 may be moved to the left may be set to correspond to the length (or number) of the entire hidden replies of the unfoldable reply 52.

Figure 9:
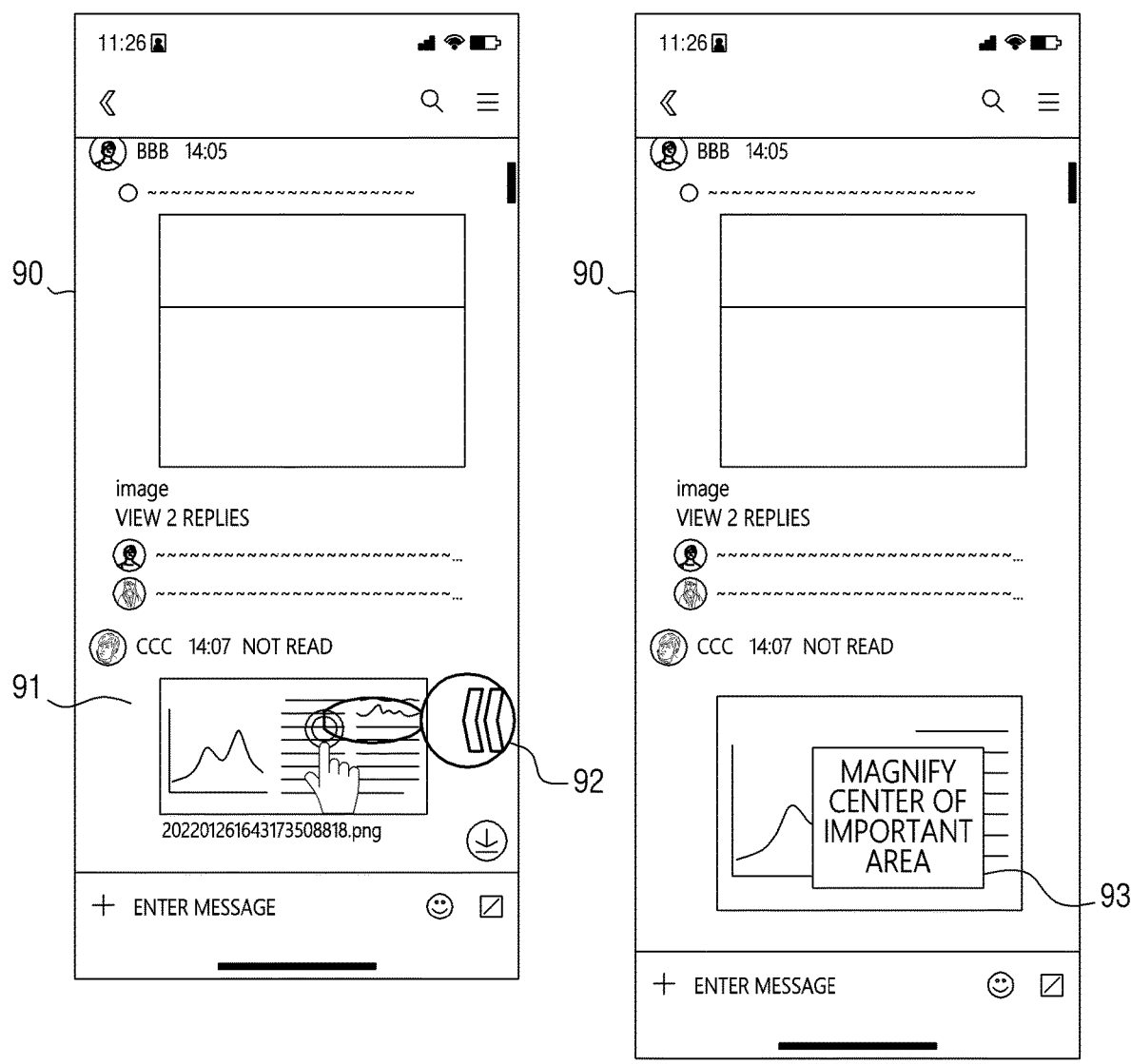
FIG. 9 is an example of magnifying and displaying an important area of content in the detailed view mode according to some exemplary embodiments of the present disclosure.

In addition, as in an example of FIG. 9, a maximum distance at which a detailed view indicator 92 may be moved to the left may be set in consideration of an actual size of an image displayed as a thumbnail 91.

In addition, the maximum distance at which the detailed view indicator may move may be set differently depending on which type of the first content is a message, a reply, an image, a diagram, a bundled photo, and the like, and may be determined in consideration of a ratio of an area occupied by the first content to a total area of the screen.

Figure 8:
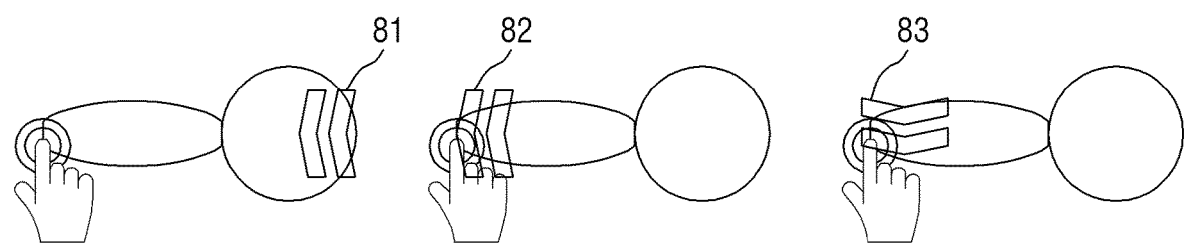
FIG. 8 is an example of a user input using a detailed view indicator according to some exemplary embodiments of the present disclosure.

As an exemplary embodiment, as illustrated in FIG. 8, the content display device 10 may be configured to change a direction of the drag input to the detailed view indicator. As an example, when the content display device 10 receives a drag input 82 for moving the detailed view indicator to the left in a state in which the detailed view indicator is displayed 81 on the right side of the area on which the first content is displayed, the content display device 10 may display the first content in the detailed view mode. In this case, when the drag input 82 in the left direction ends, the detailed view mode for the first content may be released, and the first content may be displayed in a previous state.

As another exemplary embodiment, when the drag input is changed in a downward direction 83 in a state in which the detailed view indicator is moved to the left according to the drag input 82 and then ends, the detailed view mode for the first content may be maintained as it is. In this case, the degree of detail of the first content at a time point when the direction of the drag input is changed 83 may be maintained. For example, when the direction of the drag input for moving the detailed view indicator is changed, a zoom magnification of the state in which the first content is magnified and displayed may be maintained and displayed as it is.

Figure 4:
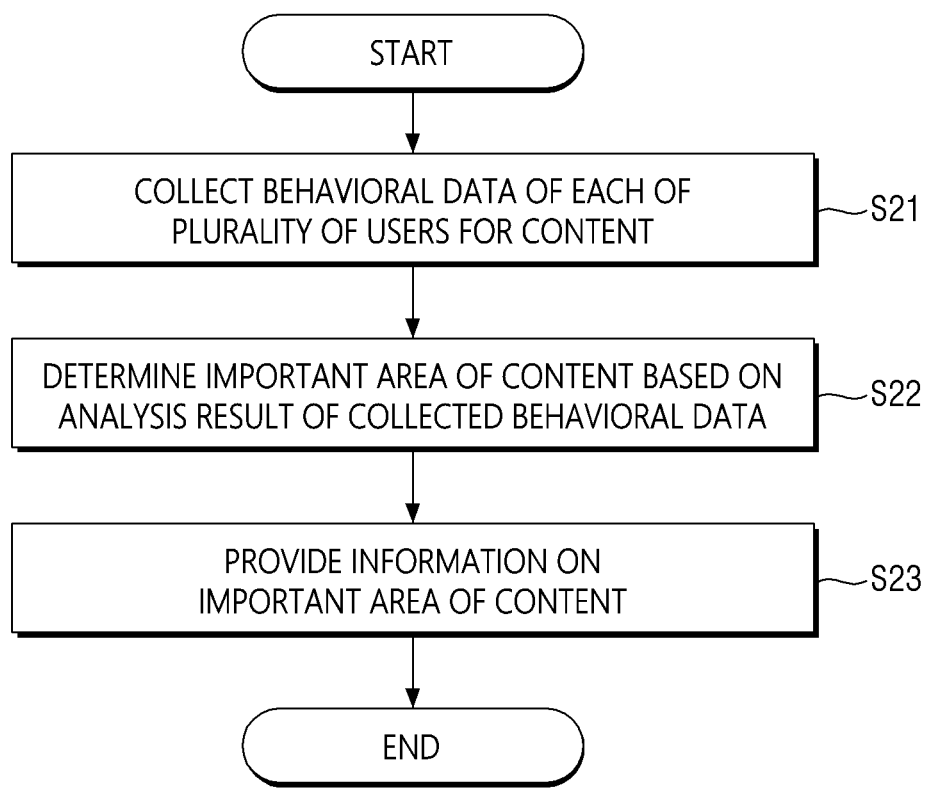
FIG. 4 is a flow chart for describing a method for analyzing content according to another exemplary embodiment of the present disclosure.

FIG. 4 is a flow chart for describing a method for analyzing content according to another exemplary embodiment of the present disclosure.

A method for analyzing content according to an exemplary embodiment of the present disclosure may be executed by the server 20 illustrated in FIG. 1. The server 20 that executes the method according to the present exemplary embodiment may be a computing device 100 illustrated in FIG. 13. The server 20 may be, for example, a device capable of performing an arithmetic function, such as a server or a PC.

It should be noted that description of a subject performing some operations included in the method according to an exemplary embodiment of the present disclosure may be omitted, and in such case, the subject is the server 20.

According to an exemplary embodiment of the present disclosure described below, it is possible to collect behavioral data of users for content and provide information obtained by analyzing the data.

First, in operation S21, the server 20 collects behavioral data of each of a plurality of users for content. Here, the plurality of users may include all the user of the content display device 10 described in FIG. 1 and users of other user terminals.

As an exemplary embodiment, operation S21 may include an operation of receiving data of at least one of the number of clicks, the staying time, the number of inquiries, the number of replies, and the number of reactions for the content from each of the plurality of user terminals.

Figure 10:
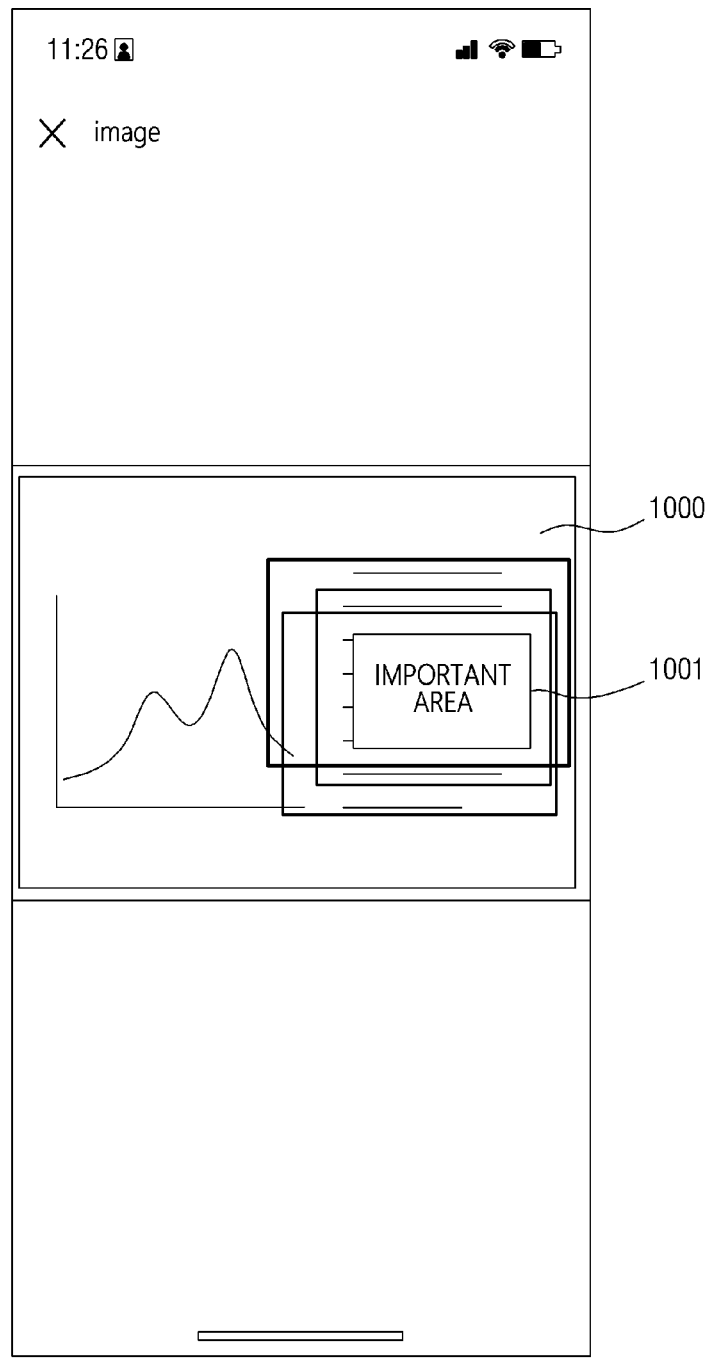
FIG. 10 is an example of determining an important area of an image in the detailed view mode according to some exemplary embodiments of the present disclosure.

In addition, when the type of content is an image 1000 as in an example in FIG. 10, operation S21 may include an operation of collecting data of a center point of a zoom-in area, a size of the zoom-in area, and a staying time of the image 1000 from each of a plurality of user terminals.

Next, in operation S22, the server 20 determines an important area of the content based on an analysis result of the behavioral data collected in operation S21. As an exemplary embodiment, the server 20 may determine the important area among all areas of the content by using data in which each value of the collected behavior data is equal to or greater than a predetermined threshold value. As an example, the entire area of the content is divided into a plurality of areas, and if the number of clicks or searches for a partial area of the plurality of divided areas exceeds a predetermined reference value, the corresponding portion may be determined as a central area of the content.

Finally, in operation S23, the server 20 may provide information on the important area of the content determined in operation S22 to the content display device 10.

Accordingly, when dragging the detailed view indicator displayed in the area around the content displayed in the form of a more view, unfolding view, or thumbnail image, the content display device 10 may magnify and display the important area of the content or preferentially expose and display the important area of the content using the information provided from the server 20.

Figure 6:
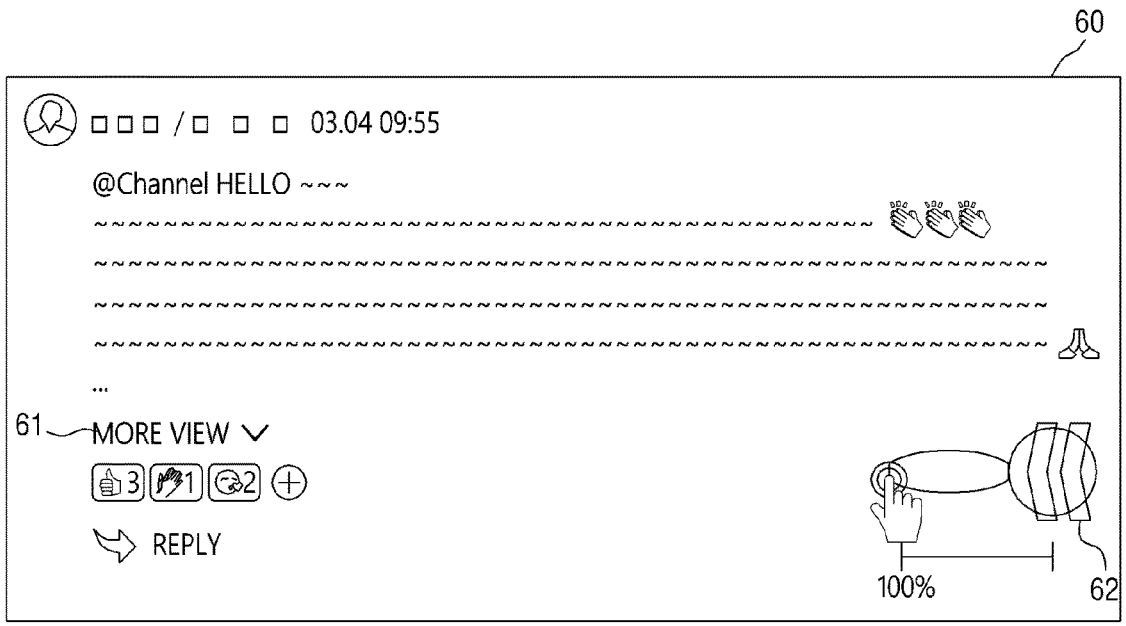
FIG. 6 is an example of displaying an important area of content in the detailed view mode according to some exemplary embodiments of the present disclosure.
Figure 6:
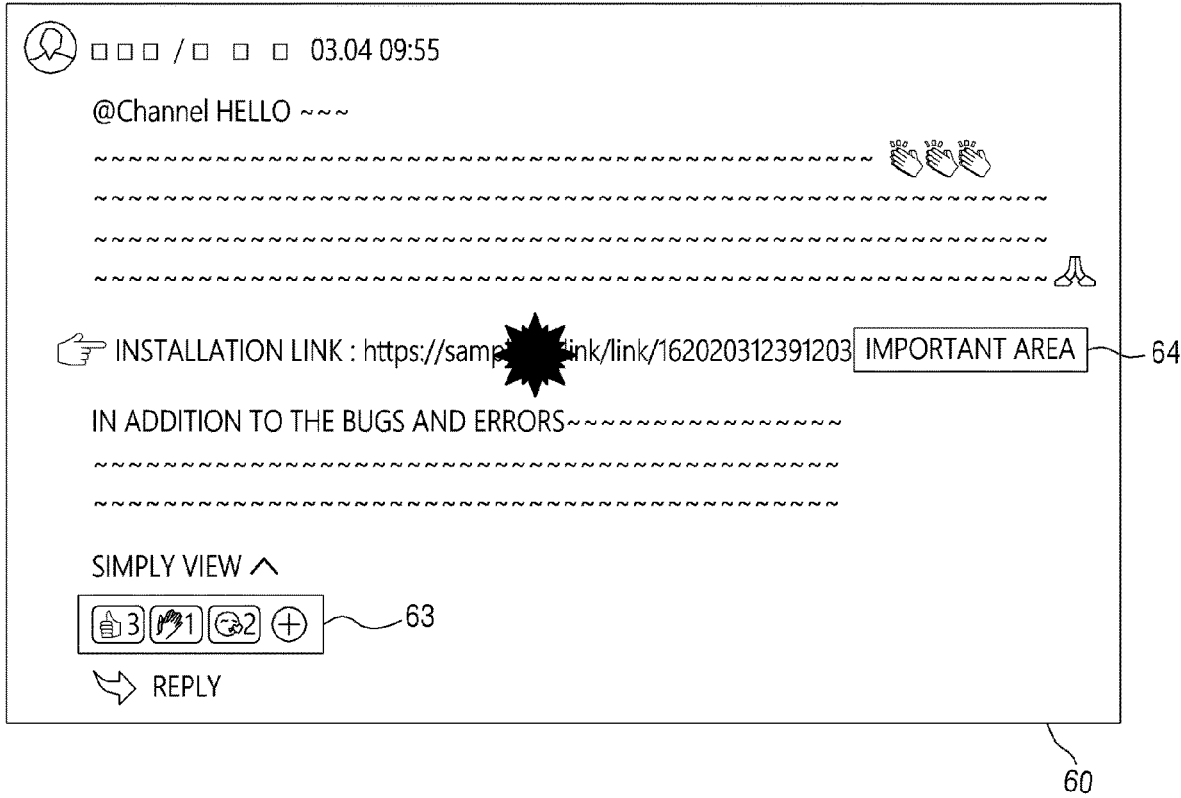

As an exemplary embodiment, as illustrated in FIG. 6, when dragging a detailed view indicator 62 displayed around more viewable content 61 on a work collaboration board screen 60 from right to left, the content display device 10 may preferentially display an important area 64 in which an installation path of a file is displayed among all hidden message contents of the more viewable content 61. In this case, the important area 64 may be determined by the server 20 analyzing behavioral data 63 such as whether or not users click on each area of the message, the number of clicks, the number of inquiries, the staying time, and the number of reactions.

As an exemplary embodiment, as illustrated in FIG. 9, when dragging the detailed view indicator 92 displayed around the thumbnail 91 on a messenger screen 90 from right to left, the content display device 10 may magnify and display an important area 93 of the entire area of an original image corresponding to the thumbnail 91. In this case, the important area 93 may be determined by the server 20 analyzing behavioral data such as a center point, size, and staying time of a user's zoom-in area for each area of the original image corresponding to the thumbnail 91. As an example, an area commonly magnified by the users for each area of the original image corresponding to the thumbnail 91 may be determined as the important area 93.

Figure 11:
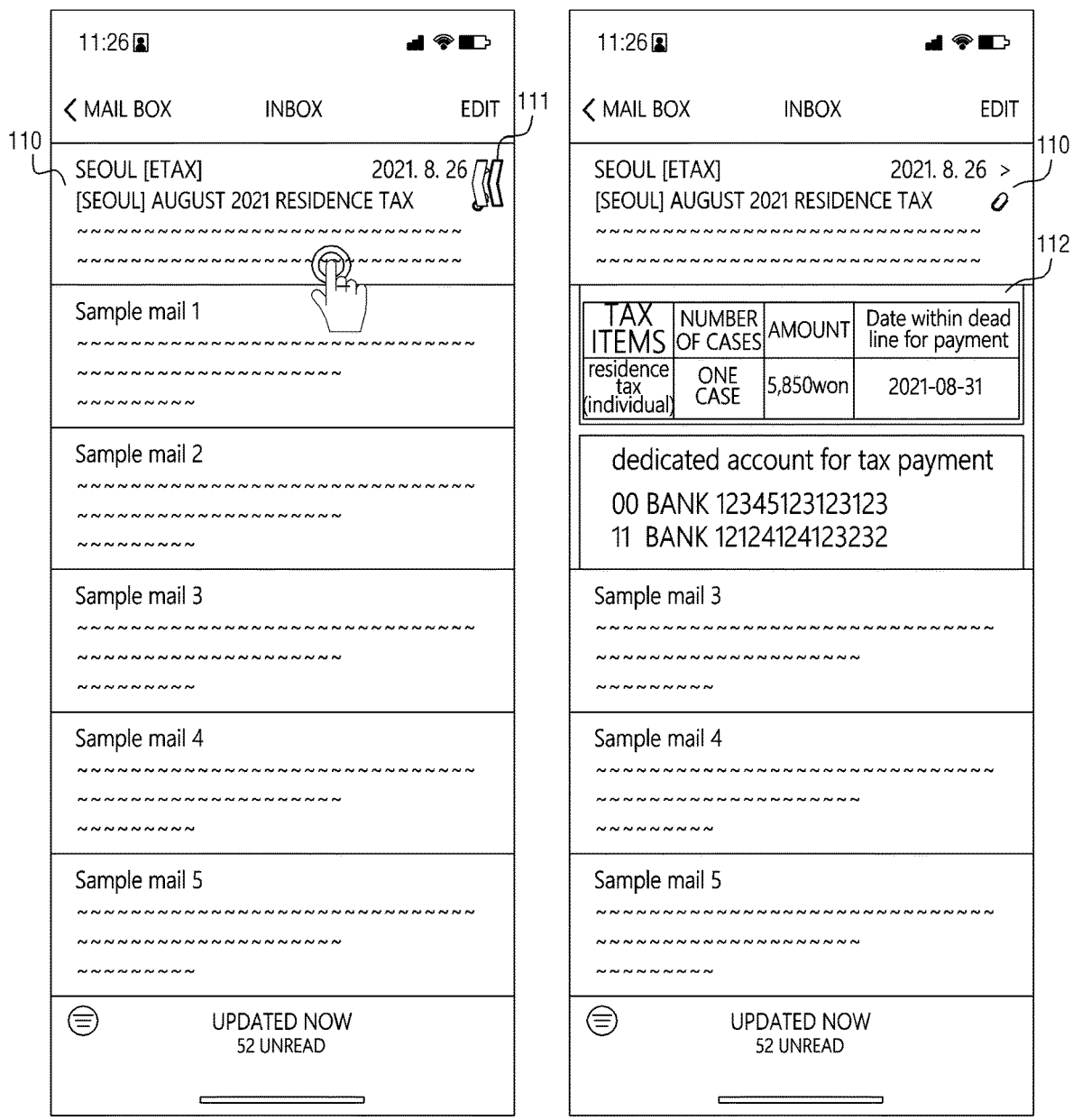
FIG. 11 is an example of magnifying and displaying an important area in a mail in a list view according to some exemplary embodiments of the present disclosure.

As an exemplary embodiment, as illustrated in FIG. 11, when dragging a detailed view indicator 111 displayed around a specific mail 110 among the entire mails displayed in an email list view from right to left, the content display device 10 may magnify and preferentially display an important area 112 in which tax payment information is displayed among the entire contents of the specific mail 110. In this case, the important area 112 may be determined by the server 20 analyzing behavioral data such as the number of clicks, the number of inquiries, the staying time, and the like of the users for each area of the mail.

Figure 12:
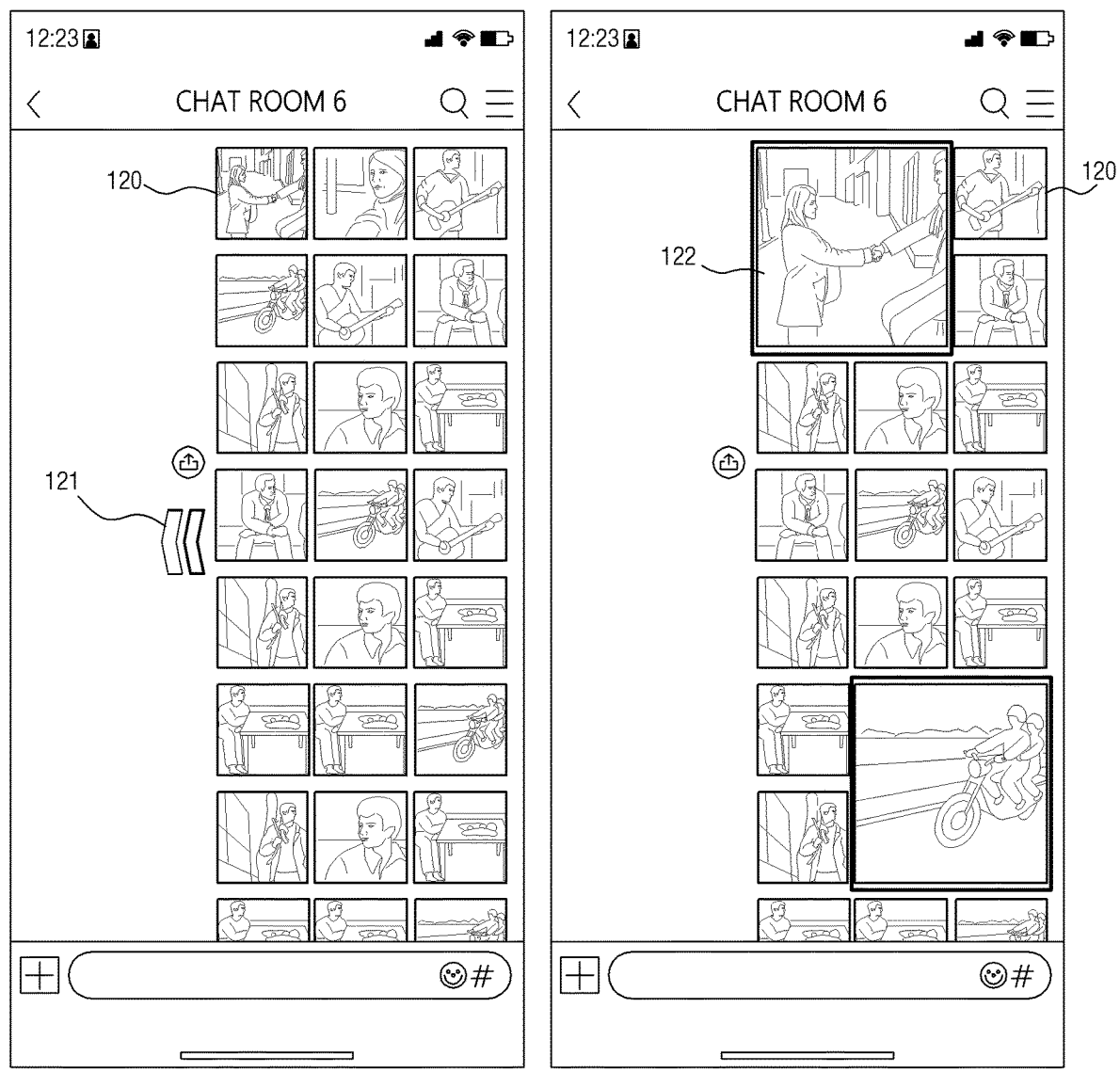
FIG. 12 is an example of magnifying and providing an image analyzed as an important area in a thumbnail view according to some exemplary embodiments of the present disclosure.

As an exemplary embodiment, as illustrated in FIG. 12, when dragging a detailed view indicator 121 displayed around a thumbnail view 120 including bundled photos from right to left, the content display device 10 may magnify and display a specific photo image corresponding to an important area 122 among photo images included in the thumbnail view 120. In this case, the important area 122 may be determined by the server 20 analyzing behavioral data, such as the number of inquires, the number of clicks, and the staying time of users for each of the bundled photos and whether or not the users zoom-in each of the bundled photos.

In addition to the previously described exemplary embodiments, the content display device 10 may determine a central area considering a user's location and destination on a map using a detailed view indicator displayed on a map thumbnail view, and may magnify and display the central area on the map.

In addition, the content display device 10 may preferentially expose and display information on items with a high selection rate of voting participants among the entire contents of a voting result by using a detailed view indicator displayed around content that shows only a portion of the voting result on a chat screen or mail screen.

According to the exemplary embodiment of the present disclosure as described above, when searching for various types of content, it is possible to provide an effect of quickly searching important information through a convenient interface without passing through several steps. In addition, by analyzing the behavioral information of the plurality of users regarding content, it is possible to preferentially expose and provide an important area of content that the users are interested in.

Figure 13:
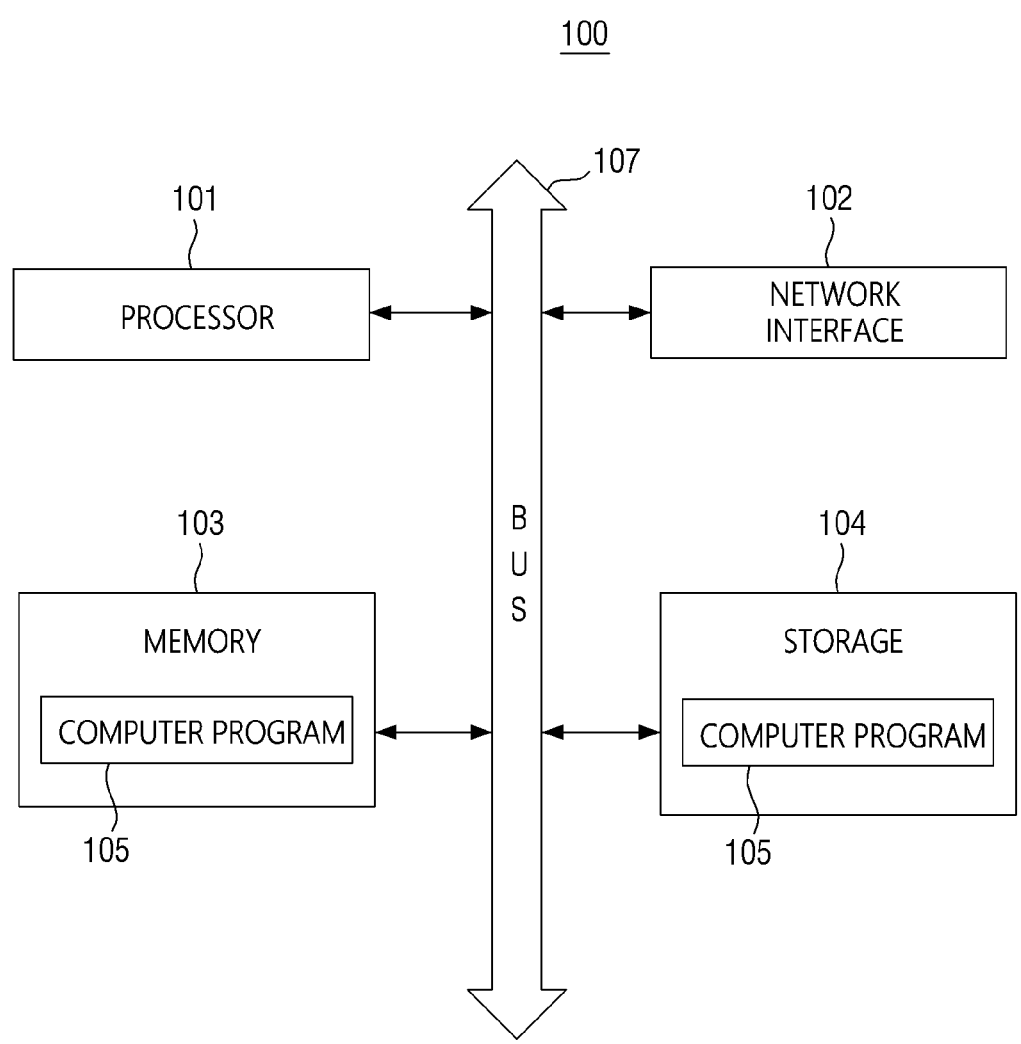
FIG. 13 is a hardware configuration diagram of an exemplary computing device capable of implementing the methods according to an exemplary embodiment of the present disclosure.

FIG. 13 is a hardware configuration diagram of an exemplary computing device 100.

Referring to FIG. 13, the computing device 100 may include one or more processors 101, a bus 107, a network interface 102, a memory 103, which loads a computer program 105 executed by the processors 101, and a storage 104 for storing the computer program 105.

The processor 101 controls overall operations of each component of computing device 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program for executing a method/operation according to various embodiments of the present disclosure. The computing device 100 may have one or more processors.

The memory 103 stores various data, instructions and/or information. The memory 103 may load one or more programs 105 from the storage 104 to execute methods/operations according to various embodiments of the present disclosure. An example of the memory 103 may be a RAM, but is not limited thereto.

The bus 107 provides communication between components of computing device 100. The bus 107 may be implemented as various types of bus such as an address bus, a data bus and a control bus.

The network interface 102 supports wired and wireless internet communication of the computing device 100. The network interface 102 may support various communication methods other than internet communication. To this end, the network interface 102 may be configured to comprise a communication module well known in the art of the present disclosure.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 105 may include one or more instructions, on which the methods/operations according to various embodiments of the present disclosure are implemented. When the computer program 105 is loaded on the memory 103, the processor 101 may perform the methods/operations in accordance with various embodiments of the present disclosure by executing the one or more instructions.

As an exemplary embodiment, a computer program 105 may include instructions for performing an operation of displaying a detailed view indicator on an area of first content that may be viewed in detail among a plurality of contents displayed on a screen, and an operation of displaying the first content in a detailed view mode in response to a user's drag input to the area of the first content.

As another exemplary embodiment, the computer program 105 may include instructions for performing an operation of collecting behavioral data of each of a plurality of users for content, an operation of determining an important area of the content based on an analysis result of the collected behavioral data, and an operation of providing information on the important area of the content.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the example embodiments without substantially departing from the principles of the present disclosure. Therefore, the disclosed example embodiments of the disclosure are used in a generic and descriptive sense only and not for purposes of limitation.

What is claimed is:

1. A method for displaying content performed by a computing device, the method comprising:
    displaying a detailed view indicator on an area of first content that is viewed in detail among a plurality of contents displayed on a screen; and
    displaying the first content in a detailed view mode in response to a user's drag input to the detailed view indicator,
    wherein the detailed view indicator is moved by the user's drag input, and
    wherein a degree of detail of the first content displayed in the detailed view mode is determined according to a movement distance of the detailed view indicator.

2. The method for displaying content of claim 1, wherein the first content is magnifiable content, and
    in the detailed view mode, a degree to which the first content is magnified is determined based on a length of the drag input.

3. The method for displaying content of claim 1, further comprising releasing the detailed view mode in response to an end of the drag input.

4. The method for displaying content of claim 1, further comprising maintaining the detailed view mode in response to an end of the drag input after a direction of the drag input is changed.

5. The method for displaying content of claim 1, further comprising maintaining the degree of detail of the first content at a time point of change when a direction of the drag input is changed.

6. The method for displaying content of claim 1, wherein the first content is magnifiable content, and
    the displaying of the first content in the detailed view mode includes magnifying and displaying the first content centered on an important area.

7. The method for displaying content of claim 1, wherein the first content is more viewable or magnifiable content, and
    the displaying of the first content in the detailed view mode includes preferentially exposing and displaying an important area of the first content.

8. The method for displaying content of claim 1, wherein the drag input is an input of dragging from right to left.

9. The method for displaying content of claim 1, wherein a maximum distance to which the detailed view indicator is moved by the drag input is determined by an attribute of the first content, and the attribute of the first content includes at least one of a type, a length, a size or a screen display ratio of the first content.

10. The method for displaying content of claim 1, wherein the displaying of the detailed view indicator on the area of the first content includes displaying the detailed view indicator in response to an analysis information on the first content being obtained.

11. A method for analyzing content performed by a server, the method comprising:

collecting behavioral data of each of a plurality of users for content;

determining an important area of the content based on an analysis result of the collected behavioral data; and providing information on the important area of the content to a display device, wherein the display device displays a detailed view indicator on an area of the content, and displays the content in a detailed view mode based on the information on the important area of the content in response to a drag input to the detailed view indicator, wherein the detailed view indicator is moved by the drag input, and wherein a degree of detail of the content displayed in the detailed view mode is determined according to a movement distance of the detailed view indicator.

12. The method for analyzing content of claim 11, wherein the collecting of the behavioral data of each of the plurality of users for the content includes receiving, from a plurality of user terminals, data of at least one of a number of clicks, a staying time, a number of inquiries, a number of replies, or a number of reactions.

13. The method for analyzing content of claim 11, wherein the collecting of the behavioral data of each of the plurality of users for the content includes collecting data of a center point and size of a zoom-in area and a staying time for an image of each of the plurality of users when a type of the content is the image.

14. The method for analyzing content of claim 11, wherein the determining of the important area of the content based on the analysis result of the collected behavioral data includes determining the important area of the content using data in which each value of the collected behavioral data is equal to or greater than a threshold value.

15. A content display device comprising:

a communication unit configured to communicate with an external device;

a display unit configured to display information; and a control unit configured to control the display unit to display a detailed view indicator on an area of first content that is viewed in detail among a plurality of contents displayed on a screen, and display the first content in a detailed view mode in response to a user's drag input to the detailed view indicator, wherein the detailed view indicator is moved by the user's drag input, and wherein a degree of detail of the first content displayed in the detailed view mode is determined according to a movement distance of the detailed view indicator.

16. The content display device of claim 15, wherein the control unit is configured to obtain information on a central area of the first content and magnify and display the first content centered on an important area of the first content.

17. The content display device of claim 16, wherein when a type of the first content is an image, the important area of the first content is determined as an area commonly magnified by a plurality of users for the image.

18. The content display device of claim 16, wherein when a type of the first content is a thumbnail view, the important area of the first content is determined as an image having a number of inquires or a staying time equal to or greater than a reference value among images belonging to the thumbnail view.

* * * * *